United States Patent
Wu et al.

(10) Patent No.: US 8,385,327 B2
(45) Date of Patent: Feb. 26, 2013

(54) ACCESS SYSTEM, METHOD, AND DEVICE

(75) Inventors: Haijun Wu, Shenzhen (CN); Hui Sheng, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 997 days.

(21) Appl. No.: 12/364,813

(22) Filed: Feb. 3, 2009

(65) Prior Publication Data

US 2009/0141710 A1    Jun. 4, 2009

Related U.S. Application Data

(63) Continuation of application No. PCT/CN2007/002555, filed on Aug. 23, 2007.

(30) Foreign Application Priority Data

Aug. 23, 2006  (CN) .......................... 2006 1 0111811

(51) Int. Cl.
*H04L 12/66* (2006.01)
(52) U.S. Cl. ...................................... 370/352; 370/466
(58) Field of Classification Search .................. None
See application file for complete search history.

(56) References Cited

U.S. PATENT DOCUMENTS

| | | | |
|---|---|---|---|
| 6,480,487 B1 | 11/2002 | Wegleitner et al. | |
| 6,600,741 B1 | 7/2003 | Chrin et al. | |
| 6,747,977 B1 | 6/2004 | Smith et al. | |
| 7,450,494 B2 * | 11/2008 | Koyuncuoglu et al. | ....... 370/216 |
| 2002/0154630 A1 | 10/2002 | Lucioni | |
| 2002/0191760 A1 | 12/2002 | Wattwood et al. | |
| 2004/0039847 A1 * | 2/2004 | Persson et al. | ................. 709/250 |

FOREIGN PATENT DOCUMENTS

| | | |
|---|---|---|
| CN | 1284806 A | 2/2001 |
| CN | 1315789 A | 10/2001 |
| CN | 1533658 A | 9/2004 |
| CN | 1550120 A | 11/2004 |
| CN | 1784079 A | 6/2006 |
| CN | 1909558 A | 2/2007 |
| EP | 146696 A2 | 10/2001 |
| WO | 01/73987 A2 | 10/2001 |

OTHER PUBLICATIONS

International Search Report issued in corresponding PCT Application No. PCT/CN2007/002555; mailed Nov. 29, 2007.
Supplementary Search Report issued in corresponding European Patent Application No. 07 80 0775; issued Jul. 30, 2009.

(Continued)

*Primary Examiner* — Bob Phunkulh
(74) *Attorney, Agent, or Firm* — Brinks Hofer Gilson & Lione

(57) ABSTRACT

An integrated access system and method and an integrated access module are provided. The system includes a broadband service interface module (310), a narrowband service interface module (320), and a main control switching interface module (10). The main control switching module (10) includes a broadband service switching module (110) providing a broadband uplink interface and a narrowband service processing module (120) providing a narrowband uplink interface and performing narrowband service data process. The broadband service switching module (110) is connected to the broadband service interface module (310) and the narrowband service interface module (320) though broadband buses (21), so as to collect and switch the narrowband service data. The broad band service switching module (110) is connected with network though the broadband uplink interface, and the narrowband service processing module (120) is connected with network though the narrowband uplink interface. Thus, the broadband service and the narrowband service can be accessed simultaneously.

15 Claims, 11 Drawing Sheets

OTHER PUBLICATIONS

Chinese Patent No. 1909558, issued on Dec. 1, 2010, granted in corresponding Chinese Patent Application No. 200610111811.4.
Office Action issued in corresponding Chinese Patent Application No. 2006101118114, mailed Nov. 7, 2008.
Office Action issued in corresponding Chinese Patent Application No. 2006101118114, mailed Oct. 23, 2009.
Office Action issued in corresponding European Patent Application No. 07800775.4, mailed Feb. 18, 2010.
Written Opinion of the International Searching Authority issued in corresponding PCT Patent Application No. PCT/CN2007/002555, mailed Nov. 29, 2007.

\* cited by examiner

ACCESS SYSTEM, METHOD, AND DEVICE

This application is a continuation of International Application No. PCT/CN2007/002555, filed on Aug. 23, 2007 which claims priority to Chinese patent application No. 200610111811.4 filed with the Chinese Patent Office on Aug. 23, 2006, entitled "Integrated access system, method and narrow-band service interface module", both of which are incorporated herein by reference.

BACKGROUND

1. Field of the Disclosure

The present invention relates to an access technique in a communication field, and more particularly, to an access system, method, and device.

2. Discussion of the Related Art

Current access systems are usually classified into broadband access systems, narrowband access systems, and integrated access systems, which will be illustrated respectively as follows.

Broadband access systems, such as Digital Subscriber Line Access Multiplexer (DSLAM), adopt a design solution based on broadband backplane bus and support a broadband service interface at a user side, such as Asymmetric Digital Subscriber Line (ADSL), Very-High-Data-Rate Digital Subscriber Line (VDSL), and Gigabit Passive Optical Network (GPON). For example, at present, there are two main kinds of DSLAM access systems, namely, Asynchronous Transmission Mode (ATM) DSLAM and IP DSLAM. ATM DSLAM is a broadband access system based on ATM connection and switch, and IP DSLAM is an access system based on Virtual Local Area Network (VLAN)+Media Access Control (MAC) or IP routing switching. Broadband access systems in any of the aforementioned forms may be classified into two types of structures, including frame-type broadband access device and box-type broadband access device, both consisting of four parts, including a master control system, a switch system, a user interface, and a backplane connection system. As shown in FIG. 1, a schematic structural view of a broadband access device is shown. The user interface board is adapted to provide a line interface for users, and different user interface boards may provide different access schemes including one or more of ADSL, VDSL, Ethernet, and Gshdsl. A broadband access system may provide multiple user interface boards, which are numbered by slot numbers, numbered from 0 or 1. A user interface board may provide multiple line interfaces that users may access, for example 16, 24, and 48 line interfaces. The line interfaces are also uniformly addressed from 0 or 1.

The master control system is adapted to provide a control and management function of the whole broadband access system.

The switch system is adapted to provide a function of converging and processing the traffic of the whole broadband access system, and provide a network interface.

The backplane system is adapted to provide connection and communication functions among the systems.

Main architectures of current narrow access products, such as Optical Network Unit (ONU), adopt a design solution based on Time Division Multiplexing (TDM) backplane bus, and support narrowband service interfaces such as Plain Old Telephone Service (POTS) interfaces and Integrated Service Digital Network (ISDN) interfaces. An architecture combining the broadband access device is referred as an integrated access device. These integrated access devices, such as Multiple Service Access Network (MSAN), Multi-Service Access Platform (MSAP), or Next Generation Digital Loop Carrier (NG DLC) devices, simultaneously adopt TDM backplane bus and Gigabit Ethernet (GE) backplane bus to support different service interfaces.

The current pure narrowband access system does not contain any packet controlling and switching module or broadband service interface, but merely provides TDM-based narrowband backplane bus. As described above, the integrated access system for both narrowband and broadband, such as the MSAN service system, provides narrowband-based TDM backplane bus and broadband-based GE backplane bus. As shown in FIG. 2, each module provides the following function.

A TDM controlling and switching module realizes traffic collection and switch of various narrowband service data by using a TDM switching network. The narrowband service data is sent to the network by the TDM controlling and switching module through network interfaces such as E1.

The voice over packet processing module converts a voice service flow into IP packets by means of voice coding and decoding, and accesses Next Generation Network (NGN). Voice service data, after being switched to the voice over packet processing module through the TDM controlling and switching module, may be sent to the network through an FE/GE network interface, sent to the network through an E1 network interface, or sent to the network through an FE/GE network interface after the packet controlling and switching module collects and switches service data traffic.

The packet controlling and switching module realizes traffic collection and switch of various broadband service data through the packet switching network and sends the broadband service data to the network through the FE/GE network interface.

The network interface module provides network interfaces such as fast Ethernet (FE) optic/electric interface, and a GE optic interface, so as to uplink to a broadband multi-service collection device or other upper-layer network device.

A service interface module sets a user interface board and provides various broadband and narrowband service access interfaces, including POTS, ISDN BRI (2B+D), ISDN PRI (30B+D), V.24 sub rate, V.24/V.35 64 kbit/s, V.35/FE1 N×64 kbit/s, E1, ADSL, ADSL2+, SHDSL(TDM/ATM), Ethernet, 2/4 line audio frequency interface, so as to provide access of various services directly.

The current pure broadband access system does not adopt the device configuration of integrated access. Only the broadband service bus is provided on the backplane, such as GE or 10 GE backplane bus, and therefore narrowband services are not supported. In addition, the conventional technical solutions for providing broadband services and narrowband services at the same time requires not only the GE or 10GE broadband bus but also the narrowband bus on the backplane, resulting in increased cost of the system, affecting the development of the system under the current trend where the broadband services are the mainstream.

In addition, user service interfaces of the prior access systems cannot be allocated flexibly according to the property of the user access services.

SUMMARY

An access system includes a broadband service interface module adapted to provide broadband service interfaces, a narrowband service interface module adapted to provide narrowband service interfaces, and a main control switching interface module.

The main control switching interface module includes a broadband service switching module that is provided with a broadband uplink interface and a narrowband service processing module that is provided with a narrowband uplink interface and performs narrowband service data process.

The broadband service switching module is connected to the broadband service interface module through broadband buses, adapted to process broadband service data, and communicate with a network via the broadband uplink interface.

The broadband service switching module is connected to the narrowband service interface module through broadband buses, adapted to collect and switch narrowband service data, and communicate with a network via the broadband uplink interface of the broadband service switching module, or communicate with a network via the narrowband uplink interface of the narrowband service processing module.

An access method includes the following steps:

The broadband service data is received by a broadband service interface module, and sent to a broadband service switching module through broadband buses, processed by the broadband service switching module, and then sent to a network via a broadband uplink interface.

The narrowband service data is received via a narrowband service interface module, and sent to a broadband service switching module through broadband buses, processed by the broadband service switching module, and then sent to a network via the broadband uplink interface; or performed narrowband service process by a narrowband service processing module, and then sent to the network via a narrowband uplink interface.

A main control switching interface module includes a broadband service switching module provided with a broadband uplink interface and a narrowband service processing module provided with a narrowband uplink interface.

The broadband service switching module receives broadband service data and narrowband service data from broadband buses, processes the broadband service data and sends the processed broadband service data to a network via the broadband uplink interface.

The broadband service switching module processes the narrowband service data, and sends the processed narrowband service data to the network via the broadband uplink interface; or sends the processed narrowband service data to the narrowband service processing module. The narrowband service processing module processes the received narrowband service data and then sends it to the network via the narrowband uplink interface.

A user interface board includes a broadband service interface board and a narrowband service interface board. The broadband service interface board receives broadband service data and sends it to the broadband service switching module through broadband buses. The narrowband service interface board receives narrowband service data, and sends it to the broadband service switching module through the broadband buses.

In the access system, the main control switching interface module, the user interface board, and the method solutions, the backplane adopts broadband buses, and can access narrowband service and broadband service simultaneously, and the uplink simultaneously supports V5.2 TDM uplink, IP voice service (VoIP) uplink, and broadband interface uplink. Systems with the same interface which need not changed may be distributed in VoIP of the interface boards to process.

The access system, the main control switching interface module, the user interface board, and the method may realize VoIP+TDMoP (TDM service based on a packet-based network) dual core process according to service configuration, thereby significantly reducing service process complexity and the cost of realizing the system.

In the narrowband service interface module, a user interface board provided with dual core process function is designed, which has the abilities of VoIP and TDMoP, and the mode is directly switched based on each user port according to service configuration. The functional requirements of the chip of the user interface board may be integrated on the same service process chip on the user interface board. This chip is provided with dual core process function, but only provides broadband and narrowband interfaces to the external.

BRIEF DESCRIPTION OF THE DRAWINGS

The present invention is described in detail as follows by reference to the embodiments and drawings, among which.

DETAILED DESCRIPTION OF THE EMBODIMENTS

The detailed embodiments of the present invention are described with reference to the accompanying drawings.

Figure 1:
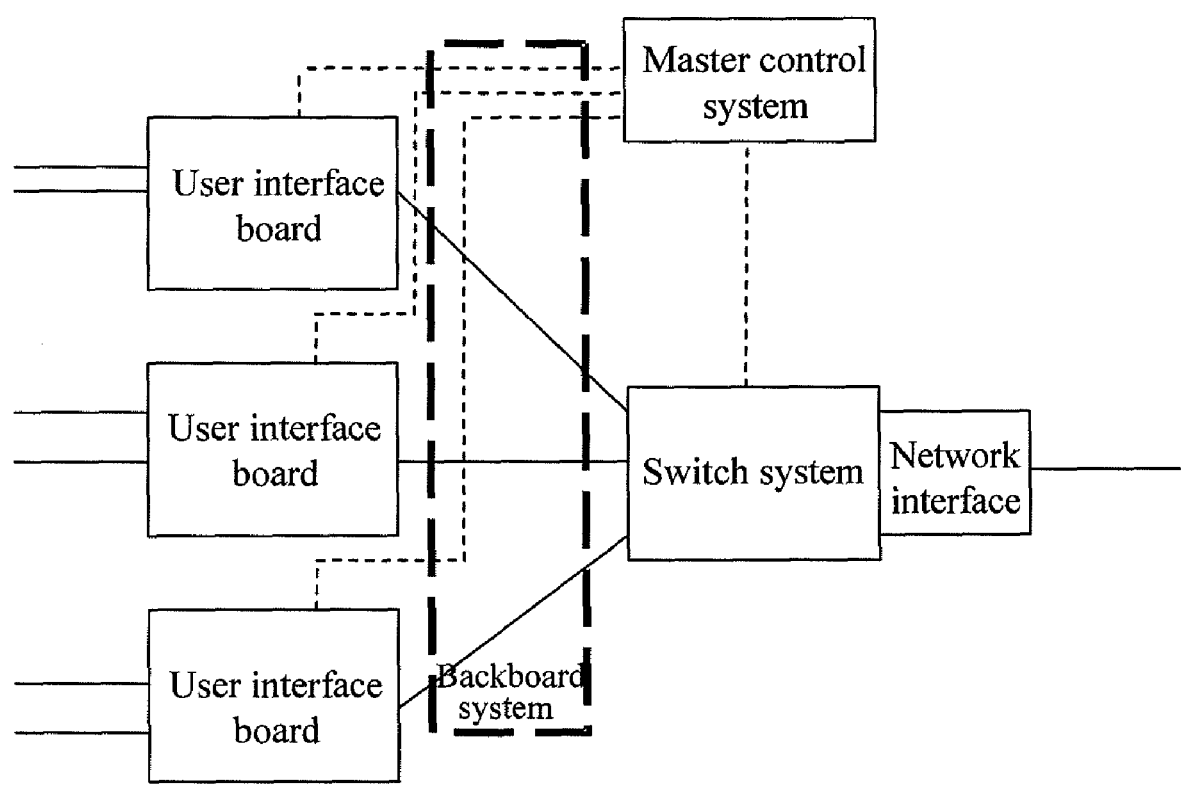
FIG. 1 is a schematic structural view of a broadband access device in the conventional art.
Figure 2:
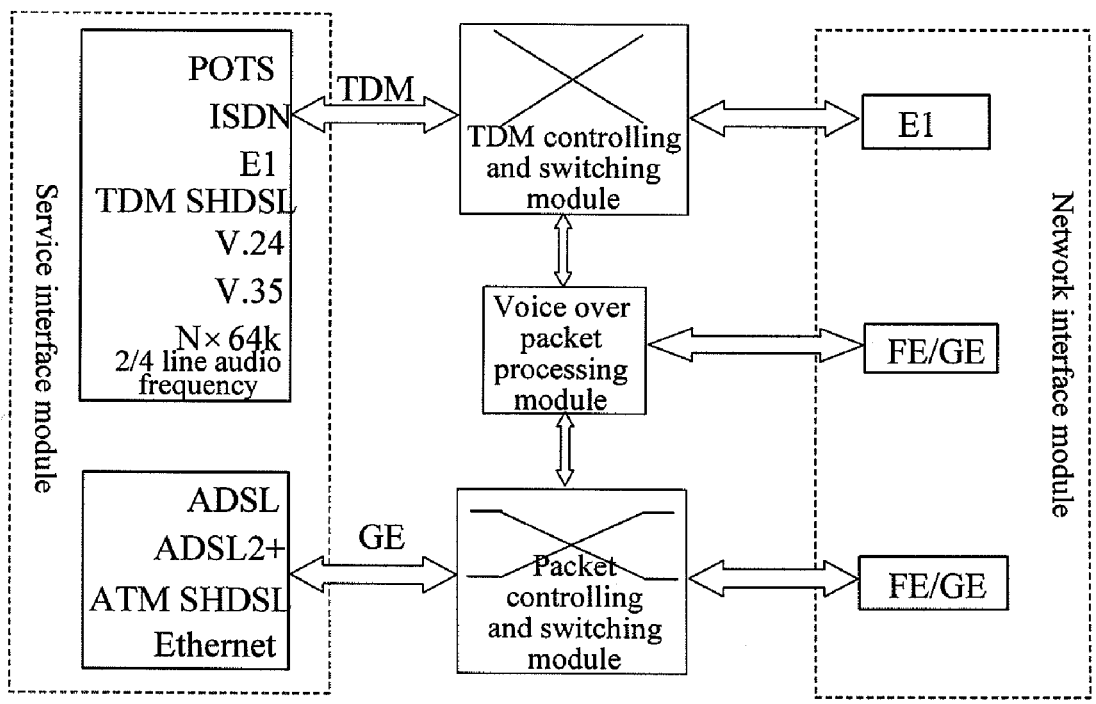
FIG. 2 is a schematic structural view of an integrated access device of the narrowband-based TDM backplane buses and broadband-based GE backplane buses in the prior art.
Figure 3:
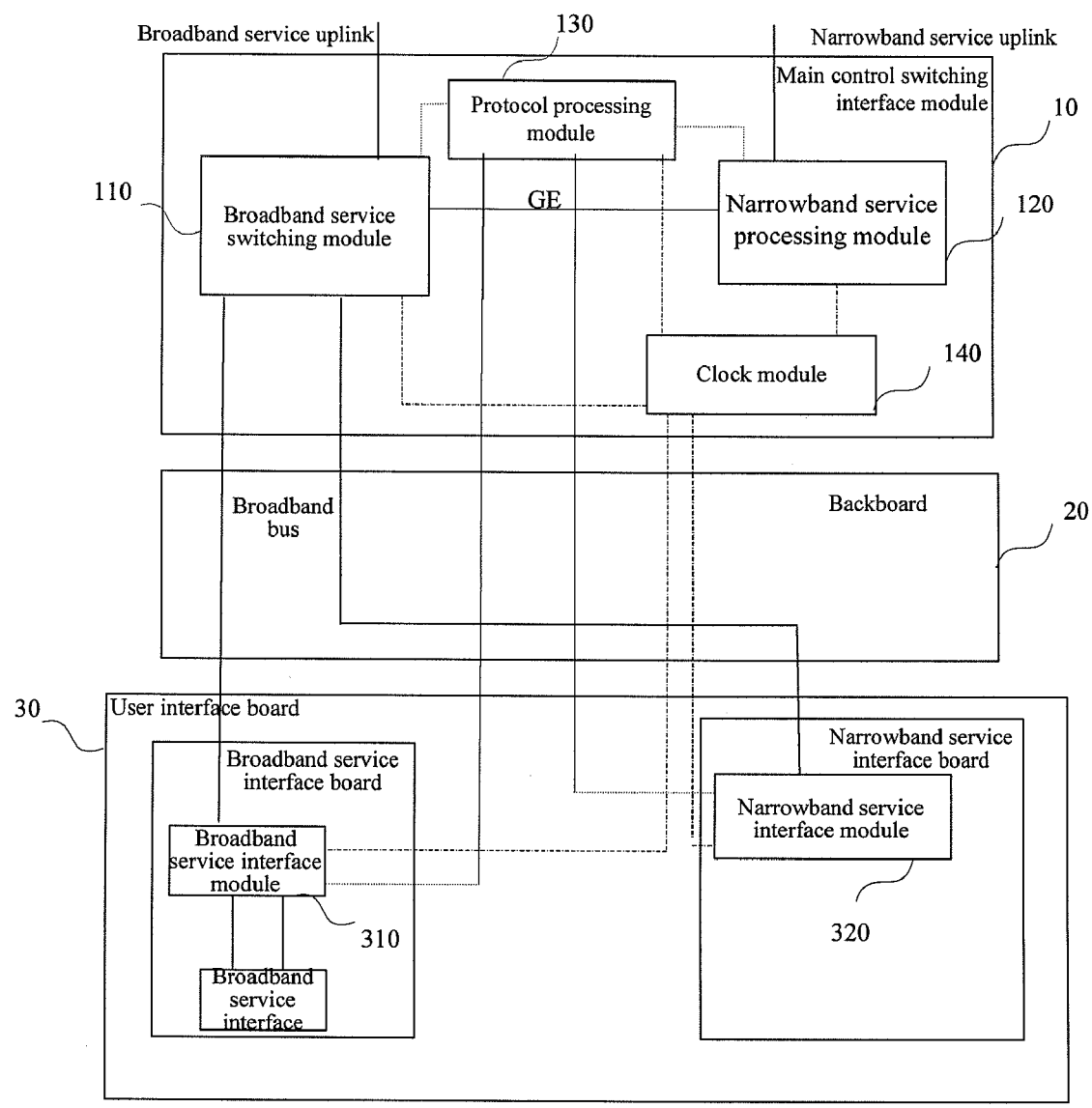
FIG. 3 is a schematic structural view of an access device assembly according to an embodiment of the present invention.

A structure of the broadband access device is shown in FIG. 3. With reference to FIG. 3, the structure includes a main control switching interface module 10, a backplane 20, and a user interface board 30.

The main control switching interface module 10 is provided with a broadband service switching module 110 that is adapted to provide a broadband uplink interface, a narrowband service processing module 120 that is adapted to provide a narrowband uplink interface and perform narrowband service data process, a protocol processing module 130 that is adapted to process broadband and narrowband protocols, and a clock module 140 that is adapted to provide a system clock.

The broadband uplink interface may be an Ethernet Uplink interface, and the narrowband uplink interface is a TDM Uplink interface.

The user interface board 30 is provided with a broadband service interface module 310 that is adapted to provide a broadband service interface, and a narrowband service interface module 320 that is adapted to provide a narrowband service interface.

Both of the broadband service interface module 310 and the narrowband service interface module 320 provided in the embodiment of the present invention are connected to the broadband service switching module 110 through broadband buses. The backplane merely adopts broadband buses, which is different from the conventional solution where the backplane adopts both broadband backplane buses and narrow backplane buses.

The broadband buses may be Gigabit Ethernet service buses, fast Ethernet service buses, or ten Gigabit Ethernet service buses.

The clock module 140, connected to each part of the system, provides a clock reference for the whole system. A clock signal is output as the uniform reference clock from the clock module 140 of the main control switching interface module 10 to each part of the whole system that requires the clock. The input of a clock source may be a clock of BITS connected via the network, a E1 clock, or a data service recovery clock, and may also be a clock generated by performing local self-oscillation. The aforementioned functions are achieved by the clock module 140, and a clock line is provided on the backplane, so as to make the clock to be transmitted to each interface that requires the clock through the clock line.

The broadband service interface module 310 may be set in the same way as the broadband service interface module in the conventional art, and will not be repeated here.

Figure 4:
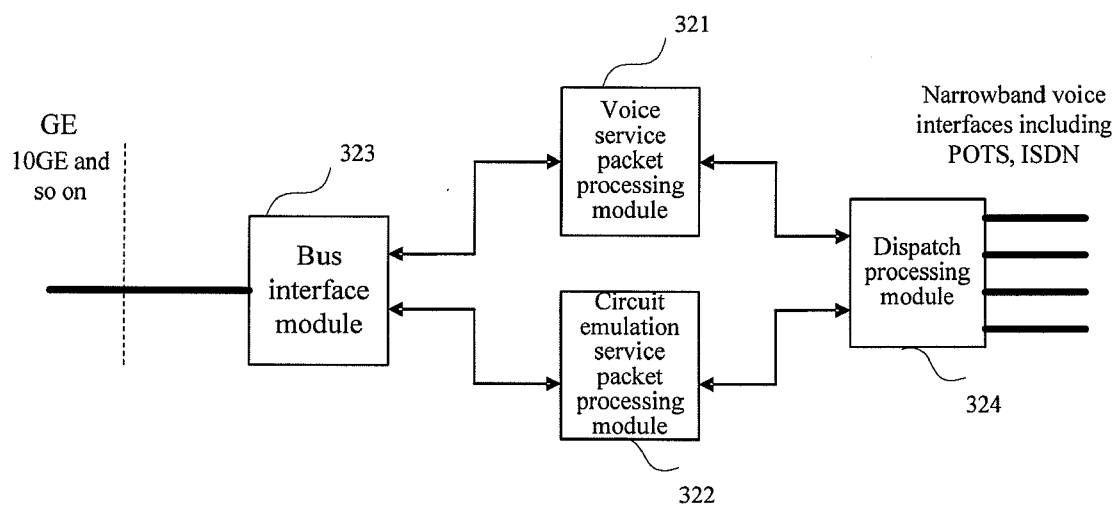
FIG. 4 is a schematic view of a narrowband service interface module according to an embodiment of the present invention.

The narrowband service interface module 320 is set according to the type of the narrowband service to be accessed, as shown in FIG. 4. FIG. 4 is a schematic structural view of the narrowband service interface module 320 according to an embodiment of the present invention, and as shown in the figure, the narrowband service interface module 320 includes a voice service packet processing module 321, a circuit emulation service (CES) packet processing module 322, a bus interface module 323, and a dispatch processing module 324.

The voice service packet processing module 321 performs voice service packet/de-packet process on narrowband service data. In an actual design solution, generally, the voice service packet processing module is an IP voice service packet processing module.

The CES packet processing module 322 performs CES data packet/de-packet process on narrowband service data. The packet/de-packet process corresponds to the narrowband service process performed by the narrowband service processing module 120 in the main control switching interface module 10.

The bus interface module 323, connected to the voice service packet processing module and the CES packet processing module, provides a broadband bus interface connecting to the broadband service switching module.

The dispatch processing module 324 dispatches narrowband service data to the voice service packet processing module 321 or the CES packet processing module 322 according to the access narrowband service attributes.

According to the whole structure of the broadband access device, the broadband service and the narrowband service accessed by a user are processed respectively as follows.

The broadband service data received by the broadband service interface module 310 is transmitted to the broadband service switching module 110 through the broadband buses, converged and switched by the broadband service switching module 110, and sent to a network via the broadband uplink interface of the broadband service switching module 110. The downlink service process of the network is similar to this process. The process is similar to the broadband service process in the conventional art, and will not be repeated here.

The narrowband service data received by the narrowband service interface module 320 is dispatched to the voice service packet processing module 321 or the CES packet processing module 322 at the dispatch processing module 324 according to the narrowband service attributes to perform the corresponding packet process, and then sent to the broadband service switching module 110 through the broadband buses after performing the corresponding packet process. The detailed steps are as follows.

The voice service packet/de-packet process is performed on the narrowband service data at the voice service packet processing module 321. As for the VoIP service, the voice encoding method such as G.711 is adopted, and after processing the IP voice service data such as adding the Ethernet header, the de-packet process of the VoIP service data is finished, so as to form a data packet to be sent to the broadband service switching module 110.

The CES packet processing module 322 performs the CES data packet/de-packet process on the narrowband service data. As for TDMoP voice service, the TDM voice service data at a certain port is encapsulated into packets, and the destination of the encapsulated packets is the narrowband service processing module 120 of the main control switching interface module 10. At the narrowband service processing module 120, the encapsulated packets are restored into TDM voice service data and processed by time slot cross-connection, and then sent to the network via the narrowband uplink interface. The process in the downlink direction is performed in a similar way.

After processing on the narrowband service interface module 320, the classification process may be performed on the received narrowband service data in the broadband service switching module 110.

The IP voice service data, after being converged and switched by the broadband service switching module 110, is directly sent to the network via the broadband uplink interface. The TDMoP service data undergoes the packet process and then is converged and switched by the broadband service switching module 110, and is then directly sent to the narrowband service processing module 120. The narrowband service processing module 120 performs the de-packet process on the narrowband service data which has undergone the packet process to restore the initial TDMoP service data, and directly sends the initial TDMoP service data to the network via the narrowband uplink interface.

Figure 5:
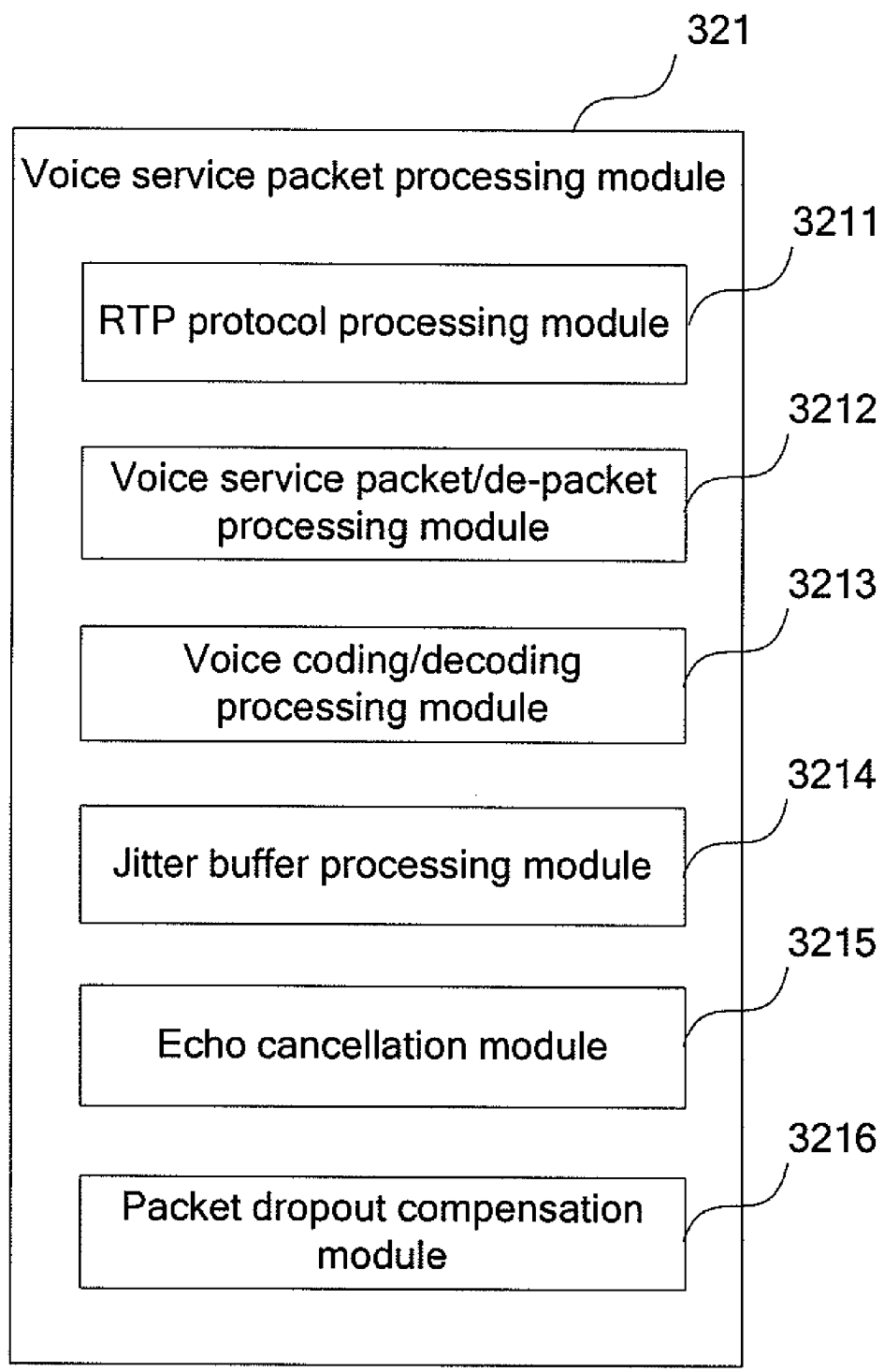
FIG. 5 is a schematic structural view of a voice service packet processing module according to an embodiment of the present invention.

In the solution, according to various service requirements, the voice service packet processing module 321 may further include a Real-Time-Protocol (RTP) protocol processing module 3211, a voice service packet/de-packet processing module 3212, a voice coding/decoding processing module 3213, a jitter buffer processing module 3214, an echo cancellation module 3215, and a packet dropout compensation module 3216, as shown in FIG. 5.

The RTP protocol processing module 3211 is adapted to perform RTP protocol process on the IP voice service data.

The voice service packet/de-packet processing module 3212 is adapted to perform the packet/de-packet process on the IP voice service data.

The voice coding/decoding processing module 3213 is adapted to perform voice coding/decoding process on the EP voice service data.

The jitter buffer processing module 3214 is adapted to perform JitterBuffer process on the IP voice service data.

The echo cancellation module 3215 is adapted to perform echo cancellation process on the IP voice service data.

The lost-packet compensation module 3216 is adapted to perform lost-packet compensation process on the IP voice service data.

The circuit emulation technology includes multiple specific solutions. For example, ATM AAL1 technique is a mature TDM circuit emulation technique realized in packet network. Likewise, in the IP Ethernet, the TDM circuit emulation may also be realized in a similar manner. The IETF PWE3 working group is responsible for studying various end-to-end emulation services on network, including frame relay, ATM, and SDH and so on. The PWE3 standard defines interfaces, timing, OAM, application occasions, and encapsulation formats under various circumstances in detail for each service to be emulated. At present, PWE3 architecture definition is standardized. The tunnel encapsulating technology adopted by the PWE3 group includes IP, L2TP, or MPLS, and the PWE3 group closely cooperates with other organizations to perfect the tunnel encapsulating technology. The PWE3 group also cooperates with the CCAMP group regarding the control plane so as to perfect the establishment and management of the tunnel.

Figure 6:
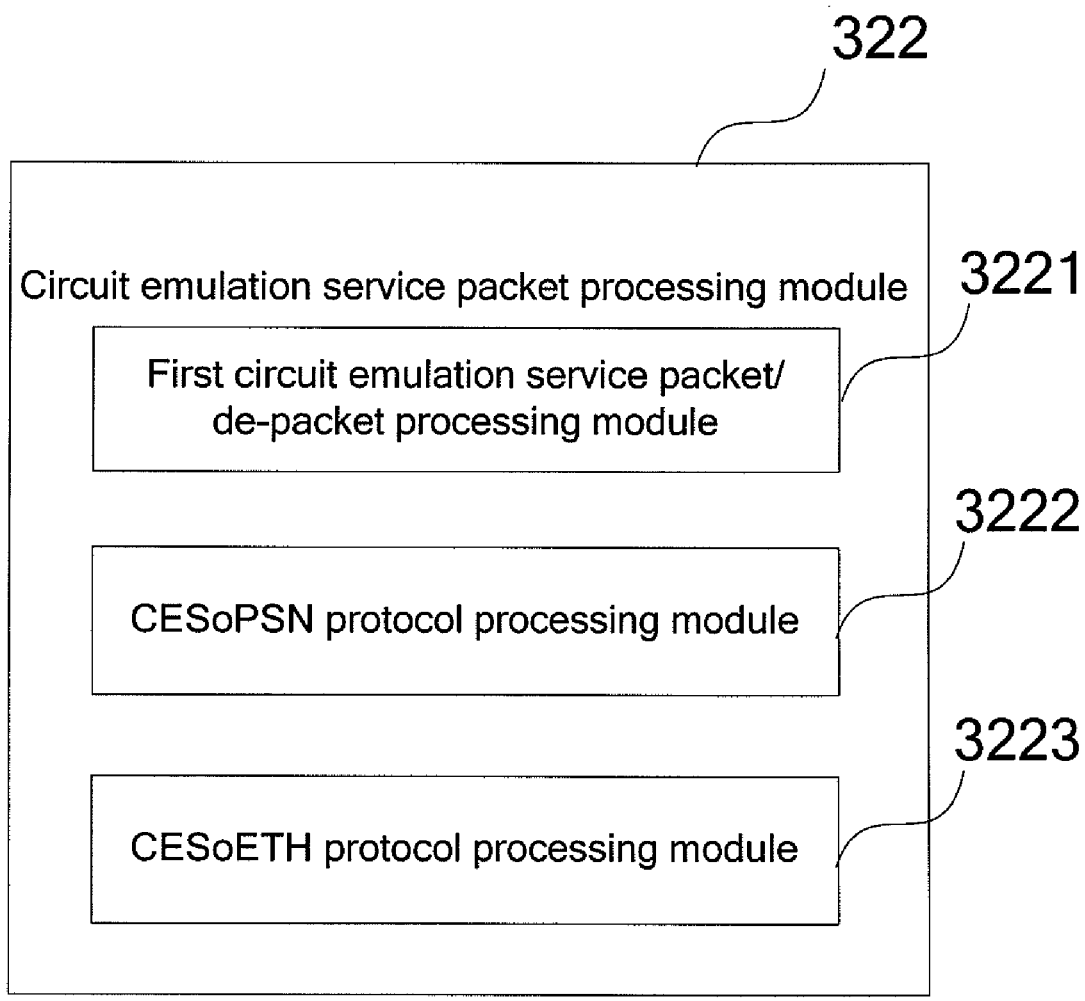
FIG. 6 is a schematic structural view of a circuit emulation service packet processing module according to an embodiment of the present invention.

According to the requirements, as shown in FIG. 6, the CES packet processing module 322 in the embodiment of the present invention further includes a first CES packet/de-packet processing module 3221, a CESoPSN protocol processing module 3222, and a CESoETH protocol processing module 3223.

The first CES packet/de-packet processing module 3221 is adapted to perform packet/de-packet process on the sent/received narrowband service data. The CESoPSN protocol processing module 3222 is adapted to perform CESoPSN protocol process on the narrowband service data.

The CESoETH protocol processing module 3223 is adapted to perform CESoETH protocol process on the narrowband service data.

Figure 7:
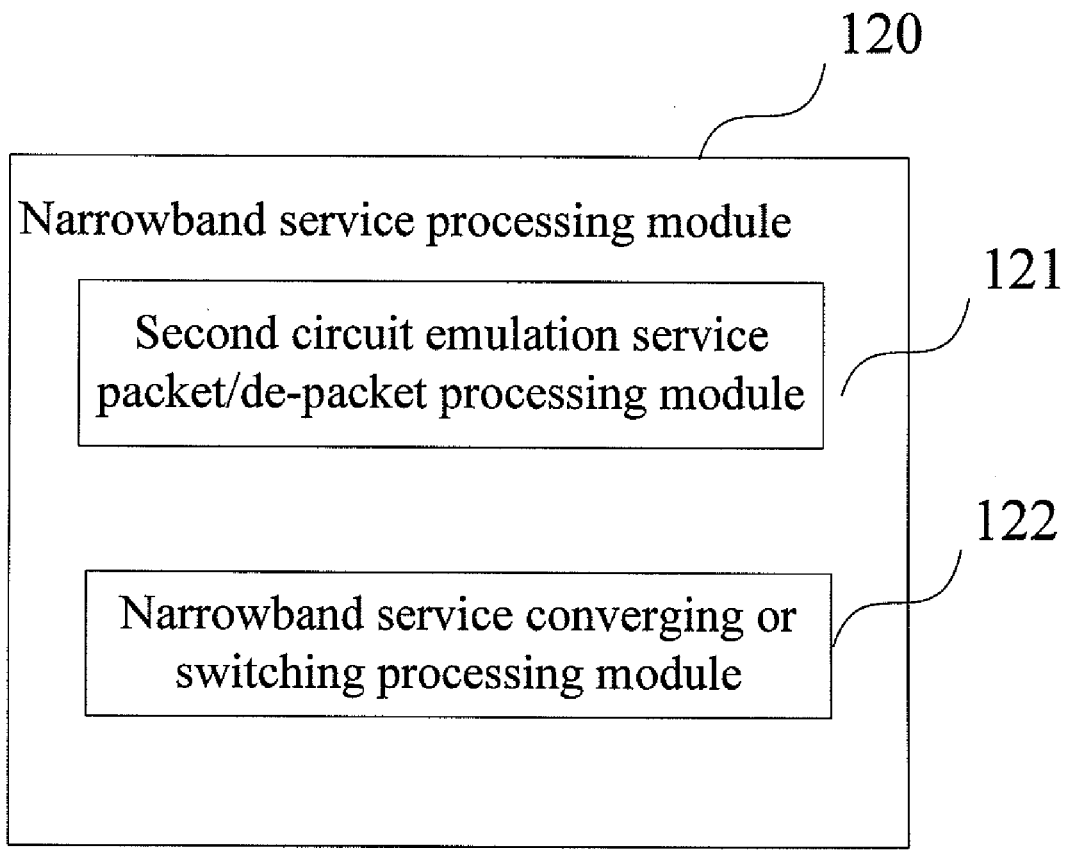
FIG. 7 is a schematic structural view of a narrowband service processing module according to an embodiment of the present invention.

Correspondingly, as shown in FIG. 7, the narrowband service processing module 120 is provided with a second CES packet/de-packet module 121, which is adapted to perform packet/de-packet process on the narrowband service data sent/received by the broadband service switching module 110.

The narrowband service processing module 120 further includes a narrowband service converging or switching processing module 122, which is adapted to perform a converging or switching process on the narrowband service data.

Figure 8:
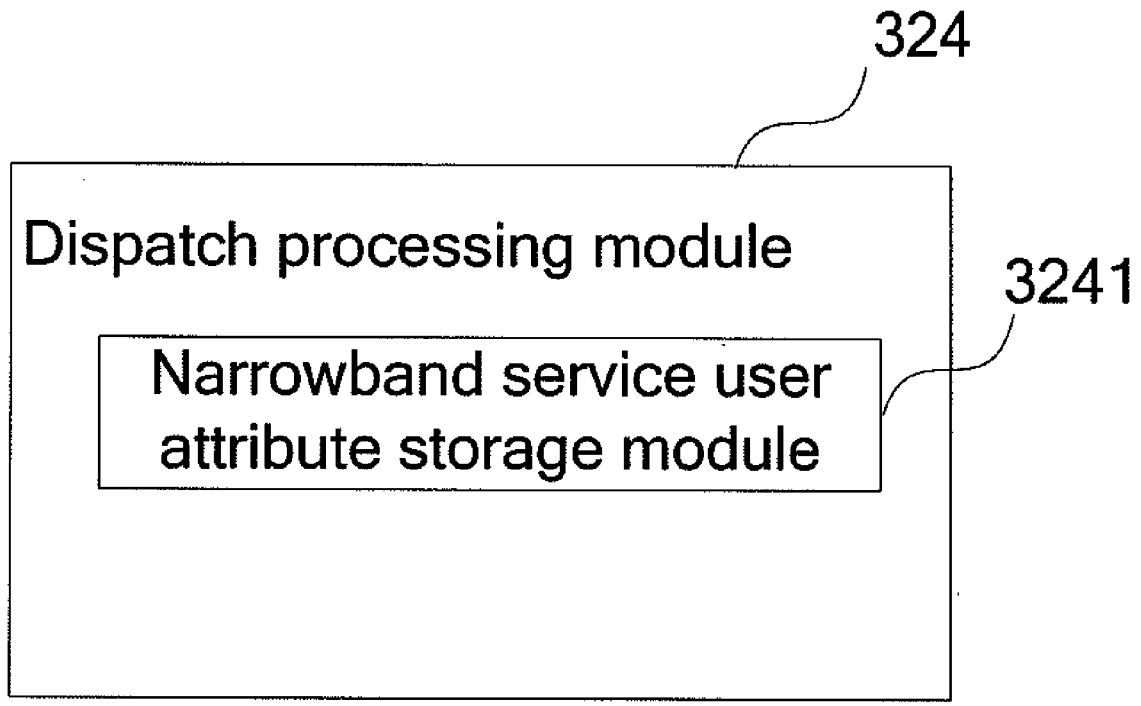
FIG. 8 is a schematic structural view of a dispatch processing module according to an embodiment of the present invention.

As shown in FIG. 8, a schematic structural view of the dispatch processing module 324 is shown. The dispatch processing module 324 is provided with a narrowband service user attribute storage module 3241 which is adapted to store user configuration information and to send the narrowband service data to the voice service packet processing module 321 or the CES packet processing module 322 according to the user configuration information.

Separated components may be adopted for constructing the design of the narrowband service interface module 320 in the embodiment of the present invention, and the aforementioned functions may also be implemented with a single chip. The chip at least has the following functions.

Figure 9:
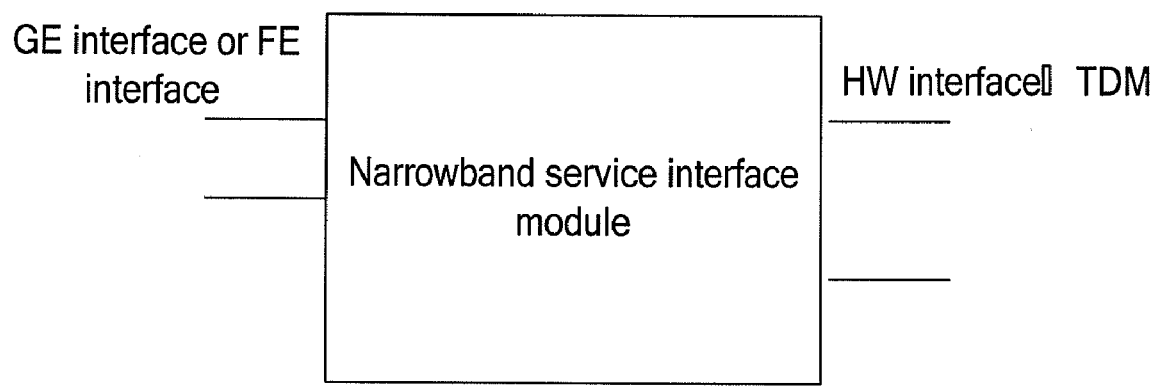
FIG. 9 is a schematic view of the connection of the integrated narrowband service interface module in a system according to an embodiment of the present invention.

The chip may provide data interface to the external, which is a double port backup or a single port. As shown in FIG. 9, a schematic view of the connection of the integrated narrowband service interface module in a system is shown.

Figure 10:
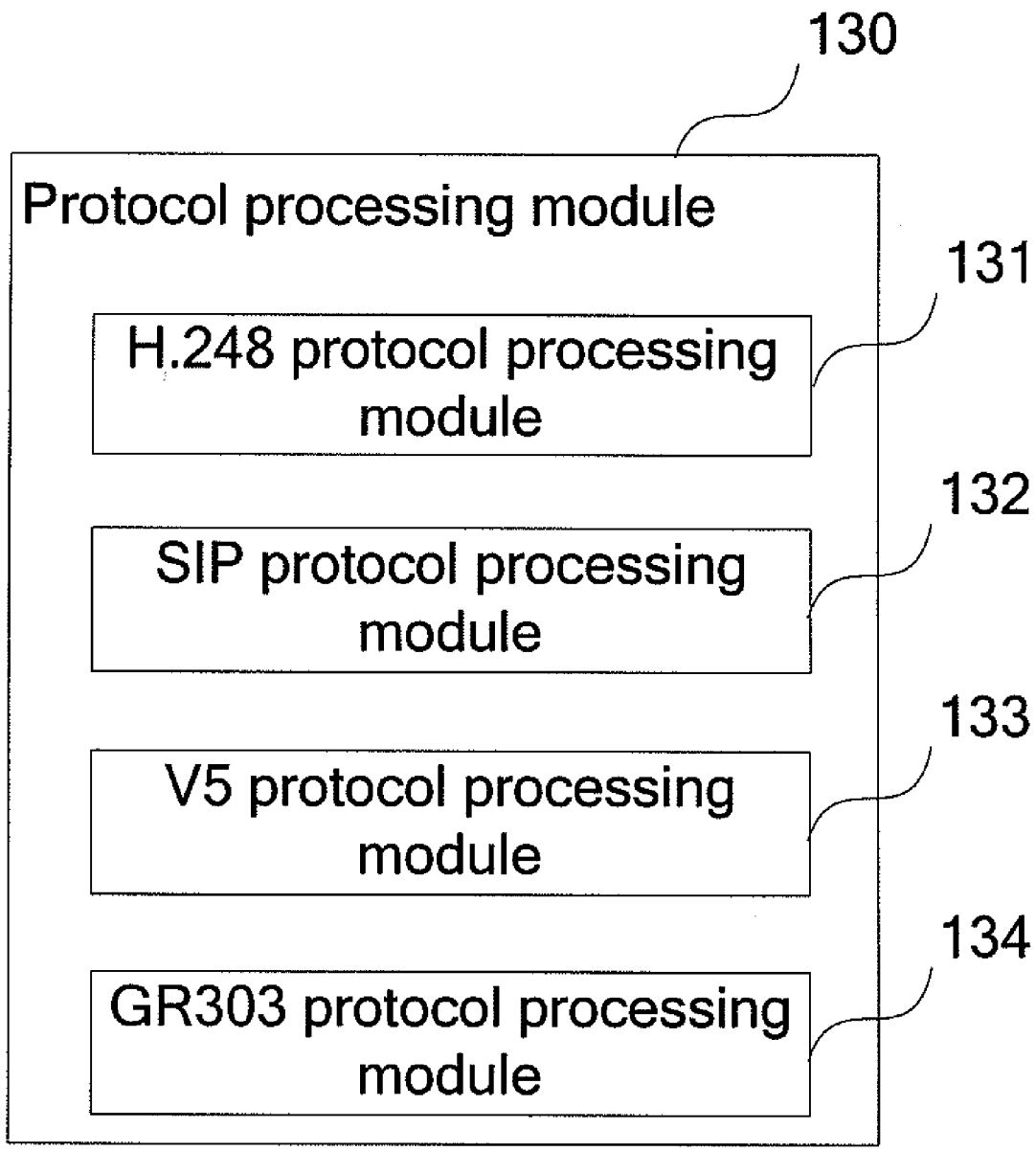
FIG. 10 is a schematic structural view of a protocol processing module according to an embodiment of the present invention.

In the solution, as shown in FIG. 10, the protocol processing module 130 may be provided with an H.248 protocol processing module 131, an SIP protocol processing module 132, a V5 protocol processing module 133, and a GR303 protocol processing module 134.

The H.248 protocol processing module 131 is adapted to process an H.248 protocol.

The SIP protocol processing module 132 is adapted to process an SIP protocol.

The V5 protocol processing module 133 is adapted to process a V5 protocol.

The GR303 protocol processing module 134 is adapted to process a GR303 protocol.

The protocol processing functions of the protocol processing module may be adapted to process various narrowband and broadband protocols, so as to ensure the smooth implementation of the broad and narrowband services in the embodiment of the present invention.

In the aforementioned embodiment, on the main control switching interface module 10, a data service uplink interface is provided by the broadband service switching module 110, and a narrowband service uplink interface is provided by the narrowband service processing module 120. The broadband uplink interface may adopt uplinks such as GE and 10GE, the narrowband uplink interface may be E1/E3, T1/T3, STM-N, or SDH in a TDM form. The narrowband protocol supports uplinks such as V5.2 and GR303.

The embodiment of the present invention realizes narrowband uplink services with low cost after the distributed VoIP process, and the backward process of the VoIP need not be realized on the main control switching interface module 10. Meanwhile, the VoIP+TDMoP process may be implemented on a single chip, thus reducing the complexity of the interface board.

Figure 11:
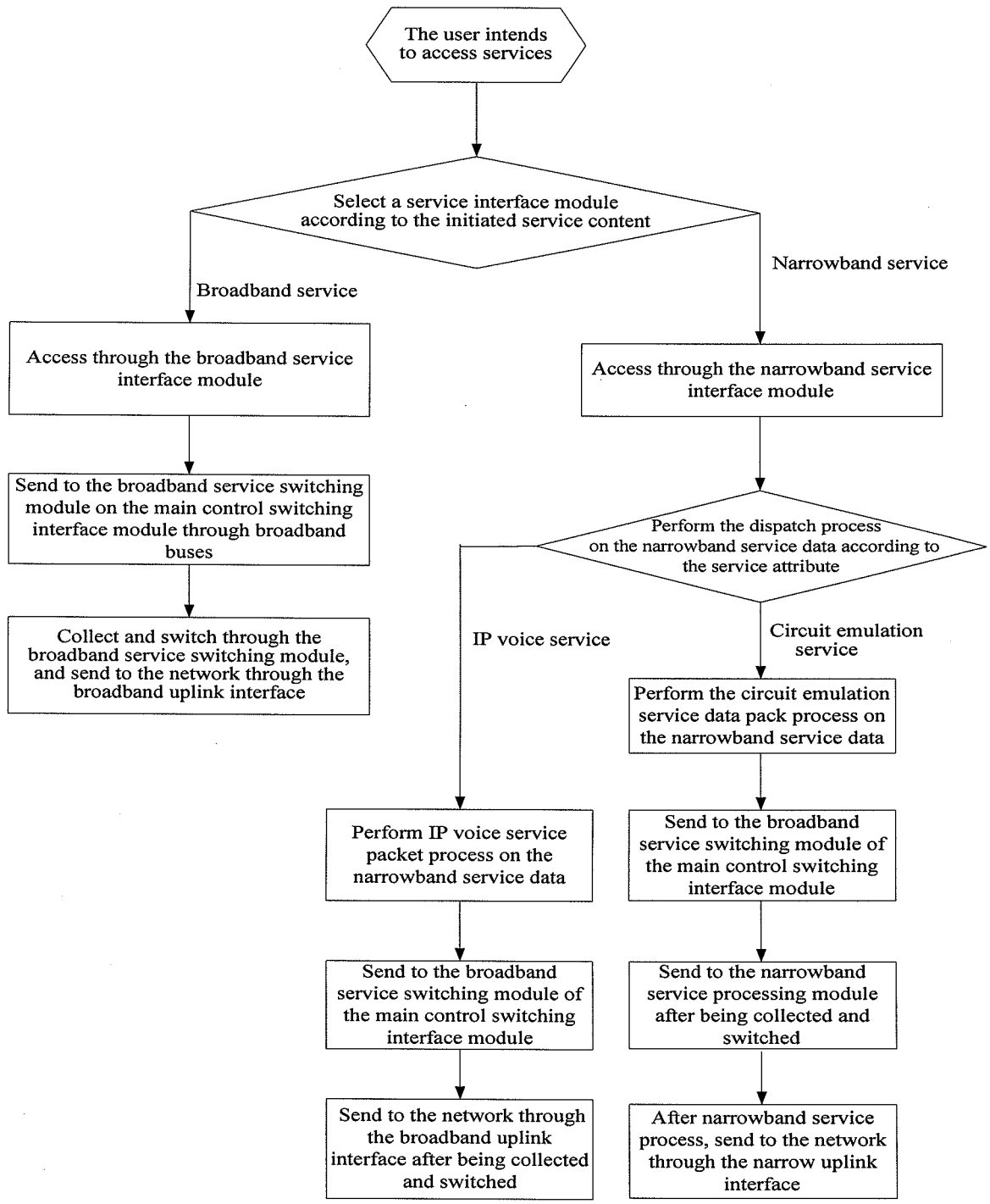
FIG. 11 is a schematic flow chart of processes of the broadband and narrowband service access method according to an embodiment of the present invention.

As shown in FIG. 11, a schematic flow chart of processes of the integrated access performed by the integrated access system according to an embodiment of the present invention is shown. As shown in FIG. 11, the broadband service and the narrowband service are processed by different methods.

The broadband service data is accessed through the broadband service interface module, sent to the broadband service switching module on the main control switching interface module through broadband buses, converged and switched through the broadband service switching module, and sent to the network through the broadband uplink interface.

The narrowband service data is accessed through the narrowband service interface module, sent to the broadband service switching module of the main control switching interface module through broadband buses, and converged and switched by the broadband service switching module.

Thereafter, the narrowband service data is sent to the network via the broadband uplink interface. Alternatively, the narrowband service data is processed by the narrowband service processing module, and then sent to the network via the narrowband uplink interface.

When the narrowband service data is being accessed via the narrowband service interface module, according to the access narrowband service attribute, the narrowband service data is classified to be narrowband service requiring voice service packet process or narrowband service requiring CES data packet process, and the corresponding process is performed on the service data.

The voice service packet process is performed on the narrowband service data.

The CES data packet process is performed on the narrowband service data.

Apparently, those skilled in the art may modify or change the present invention without departing from the spirit and scope of the present invention. Thus, if the modifications and changes of the present invention fall in the scope of the claims and the equivalent technique of the present invention, the present invention also includes the modifications and changes.

What is claimed is:

1. An access system, comprising a broadband service interface module provided with a broadband service interface, a narrowband service interface module provided with a narrowband service interface, and a main control switching interface module, wherein:
the main control switching interface module comprises a broadband service switching module that is provided with a broadband uplink interface, and a narrowband service processing module that is provided with a narrowband uplink interface and performs a narrowband service data process;
the broadband service switching module is connected to the broadband service interface module through broadband buses, adapted to process broadband service data and communicate with a network via the broadband uplink interface; and
the broadband service switching module is connected to the narrowband service interface module through the broadband buses, where the narrowband service interface module is adapted to process narrowband service data and is adapted to communicate with the network via the broadband uplink interface of the broadband service switching module or to communicate with the network via the narrowband uplink interface of the narrowband service processing module;
wherein the narrowband service interface module comprises:
a voice service packet processing module, adapted to perform a voice service packet process or a voice service de-packet process on the narrowband service data; and
a circuit emulation service (CES) packet processing module, adapted to perform a circuit emulation service data packet process or a circuit emulation service data de-packet process on the narrowband service data.

2. The access system according to claim 1, wherein the narrowband service interface module comprises:
a dispatch processing module, adapted to dispatch the narrowband service data to the voice service packet processing module or the CES packet processing module according to an access narrowband service attribute; and
a bus interface module, connected to the voice service packet processing module and the CES packet processing module, adapted to provide a broadband bus interface to the broadband service switching module.

3. The access system according to claim 2, wherein the dispatch processing module is provided with a narrowband service user attribute storage module, adapted to store narrowband user configuration information;
the dispatch processing module sends the narrowband service data to the voice service packet processing module or the CES packet processing module according to the narrowband user configuration information.

4. The access system according to claim 1, wherein the voice service packet processing module is an IP voice service packet processing module.

5. The access system according to claim 4, wherein the voice service packet processing module comprises:
a Real-Time-Protocol (RTP) protocol processing module, adapted to perform a RTP protocol process on IP voice service data.

6. The access system according to claim 4, wherein the voice service packet processing module comprises:
a voice service packet/de-packet processing module, adapted to perform a packet/de-packet process on IP voice service data.

7. The access system according to claim 1, wherein:
the CES packet processing module further comprises a first CES packet/de-packet processing module, adapted to perform a packet/de-packet process on the sent/received narrowband service data;
the narrowband service processing module comprises a second CES packet/de-packet module, adapted to perform the packet/de-packet process on the narrowband service data sent/received by the broadband service switching module.

8. The access system according to claim 7, wherein the narrowband service data processing module comprises:
a narrowband service converging or switching module, adapted to perform a converging or switching process on the narrowband service data.

9. The access system according to claim 1, wherein the CES packet processing module comprises:
a CESoPSN protocol processing module, adapted to perform a CESoPSN protocol process on the narrowband service data, or
a CESoETH protocol processing module, adapted to perform a CESoETH protocol process on the narrowband service data.

10. The access system according to claim 1, wherein the broadband service buses are Gigabit Ethernet service buses, fast Ethernet service buses, or ten Gigabit Ethernet service buses.

11. An access method, comprising:
receiving broadband service data by a broadband service interface module, sending the broadband service data from the broadband service interface module through broadband buses to a broadband service switching module, processing the broadband service data by the broadband service switching module and sending by the broadband service switching module the processed broadband service data to a network via a broadband uplink interface;
receiving narrowband service data by a narrowband service interface module; wherein the receiving of the narrowband service data by the narrowband service interface module comprising: performing a voice service packet/de-packet process or a circuit emulation service (CES) data packet process on the narrowband service data;
sending the narrowband service data from the narrowband service interface module through the broadband buses to the broadband service switching module, switching and processing on the narrowband service data by the broadband service switching module, and sending by the broadband service switching module the narrowband service data switched and processed by the broadband service switching module to the network via the broadband uplink interface, or
performing, by a narrowband service processing module, a narrowband service process on the narrowband service data from the narrowband service interface module, and sending by the narrowband service processing module the processed narrowband service data to the network via a narrowband uplink interface.

12. The method according to claim 11, comprising:
classifying the narrowband service data into a narrowband service requiring the voice service packet process and a narrowband service requiring the CES data packet process according to the access narrowband service attributes.

13. A main control switching interface module, comprising a broadband service switching module provided with a broadband uplink interface and a narrowband service processing module provided with a narrowband uplink interface, wherein:
the broadband service switching module is adapted to:
receive broadband service data and narrowband service data through broadband buses, process the broadband service data, and send the processed broadband service data to a network through the broadband uplink interface;
converge and switch the narrowband service data which undergoes voice service packet process, send the processed narrowband service data to the network via the broadband uplink interface,
converge and switch the narrowband service data undergoing circuit emulation service, CES, data packet process, and to send the processed narrowband service data undergoing the CES data packet process to the narrowband service processing module; and
the narrowband service processing module is adapted to process the received narrowband service data, and send the processed narrowed service data to the network via the narrowband uplink interface.

14. A user interface board, comprising:
a broadband service interface board, adapted to receive broadband service data, and send the broadband service data to a broadband service switching module through broadband buses; and
a narrowband service interface board, adapted to receive narrowband service data, and send the narrowband service data to the broadband service switching module through the broadband buses;
wherein the narrowband service interface board comprises:
a voice service packet processing module, adapted to perform a voice service packet process or a voice service packet de-packet process on the narrowband service data; and
a circuit emulation service (CES) packet processing module, adapted to perform a CES data packet process or a CES data de-packet process on the narrowband service data.

15. The user interface board according to claim 14, wherein the narrowband service interface comprises:
a dispatch processing module, adapted to dispatch the narrowband service data to the voice service packet processing module or the CES packet processing module according to the access narrowband service attributes; and
a bus interface module, connected to the voice service packet processing module and the CES packet processing module, and adapted to provide a broadband bus interface to the broadband service switching module.

* * * * *

UNITED STATES PATENT AND TRADEMARK OFFICE
CERTIFICATE OF CORRECTION

| | | |
|---|---|---|
| PATENT NO. | : 8,385,327 B2 | Page 1 of 1 |
| APPLICATION NO. | : 12/364813 | |
| DATED | : February 26, 2013 | |
| INVENTOR(S) | : Wu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this
Second Day of December, 2014

Michelle K. Lee
*Deputy Director of the United States Patent and Trademark Office*